United States Patent [19]

Bergin et al.

[11] Patent Number: 4,707,767

[45] Date of Patent: Nov. 17, 1987

[54] MOTOR VEHICLE HEADLIGHT MODULE

[75] Inventors: John A. Bergin, Hancock, N.H.; George J. English, Reading, Mass.

[73] Assignee: GTE Products Corporation

[21] Appl. No.: 840,271

[22] Filed: Mar. 17, 1986

[51] Int. Cl.[4] ............................................. B60Q 1/00
[52] U.S. Cl. ..................................... 362/61; 362/310; 362/80; 362/83
[58] Field of Search ..................... 362/61, 80, 87, 307, 362/309, 308, 310, 268, 267, 340, 83

[56] References Cited

U.S. PATENT DOCUMENTS

| | | | |
|---|---|---|---|
| 3,408,491 | 10/1968 | George | 362/61 |
| 4,451,873 | 5/1984 | Tyler et al. | 362/310 |
| 4,459,644 | 7/1984 | Bailly | 362/83 |
| 4,507,712 | 3/1985 | Dolan et al. | 362/61 |
| 4,528,619 | 7/1985 | Dolan et al. | 362/61 |
| 4,569,002 | 2/1986 | English et al. | 362/80 |
| 4,569,007 | 2/1986 | Dick | 362/61 |

Primary Examiner—Raymond A. Nelli
Attorney, Agent, or Firm—Lawrence R. Fraley

[57] ABSTRACT

A motor vehicle headlight module capable of being used as part of a headlighting assembly containing several (e.g., at least four) such modules therein. Each assembly may in turn provide one-half of the total forward lighting system for a motor vehicle. Each module includes a high temperature plastic parabolic reflector, a low wattage (e.g., 18 watts) tungsten halogen capsule, and a planar glass lens for providing a seal for the module. Each module is adapted for being readily aligned within a holder member which forms part of such an assembly and may be retained therein by relatively simple means (e.g., a wireform). The invention further includes a connector means (e.g., female socket) designed for being slidably positioned on the rear neck portion of the invention's reflector to effect contact with the invention's capsule.

13 Claims, 8 Drawing Figures

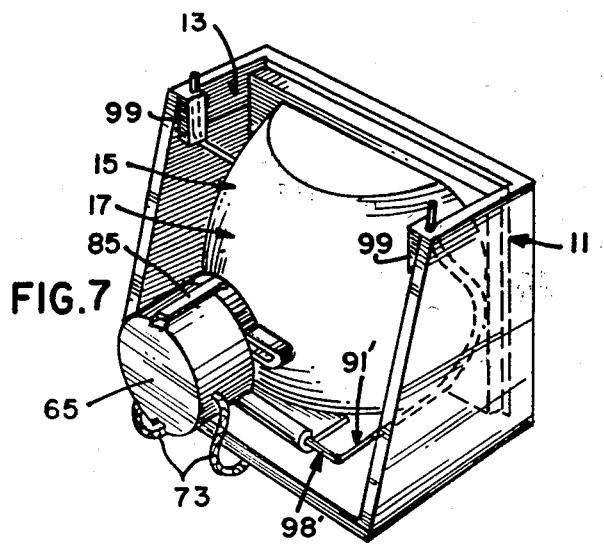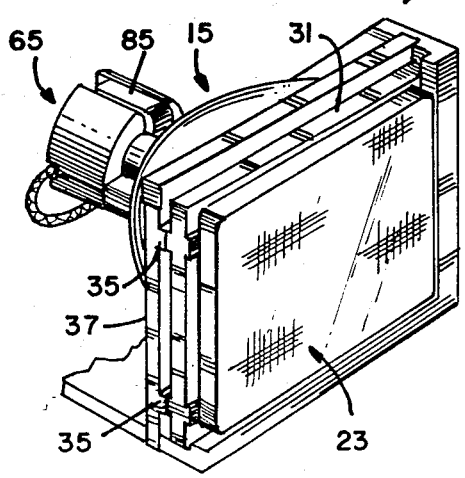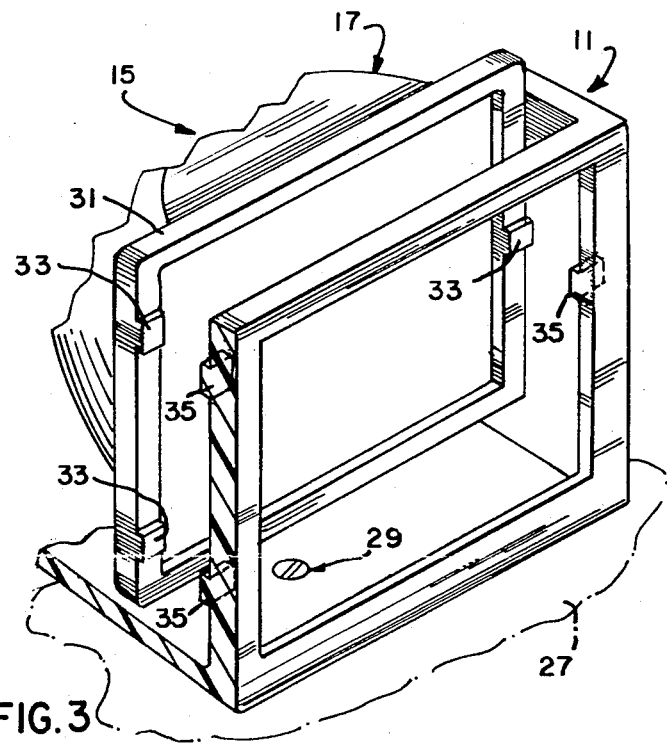

MOTOR VEHICLE HEADLIGHT MODULE

CROSS REFERENCE TO COPENDING APPLICATIONS

In Ser. No. 598,604, now U.S. Pat. No. 4,545,001, entitled "Sealed Lens Member For Use In A Motor Vehicle Lighting System" (Inventors: G. J. English et al), there is defined a hollow, single piece lens member for use in a motor vehicle lighting system containing a plurality of individual lighting modules.

In Ser. No. 598,613, now U.S. Pat. No. 4,569 002, entitled "Motor Vehicle Lighting System" (Inventors: G. J. English et al), there is defined a motor vehicle lighting system wherein a plurality of modules are used in combination with a common lens member designed to control the light from the modules.

In Ser. No. 598,614, entitled "Motor Vehicle Lighting System Including A Sealed Lens Member As Part Thereof" (Inventors: R. E. Levin et al), there is defined a motor vehicle lighting system including a light source and reflector means, a hollow, enclosed lens having a contoured front surface with a rear lensing surface, and a means for mounting the lens in a recess of said vehicle to assure adequate passage of light from the source through the lens.

In Ser. No. 598,605, now DES. 285,351 and entitled "Lamp-Reflector Module For Use In A Motor Vehicle Headlighting System" (Inventors: G. J. English et al), there is claimed the ornamental design for a lamp-reflector module for use in a motor vehicle lighting system.

In Ser. No. 598,606, now Des. 284,112 and entitled "Lens Member For A Motor Vehicle Headlighting System" (Inventors: G. J. English et al), there is claimed the ornamental design for a motor vehicle headlight lens member having a plurality of stepped lensing surfaces thereon and a slightly curved forward surface.

In Ser. No. 598,607 now Des. 283,362 and entitled "Lens Component For A Motor Vehicle Headlighting System" (Inventors: R. E. Levin et al). there is claimed the ornamental design for a motor vehicle headlight lens having a sloped, clear front surface, a pair of side walls, a bottom wall, and a stepped, rear lensing portion to in turn define a sealed, single piece component.

In Ser. No. 598,615, entitled "Lighting Module For Motor Vehicle Lighting System" (Inventors: G. J. English et al). there is defined a lighting module for use as a part of a vehicle headlighting system wherein the module includes a reflector, a small tungsten halogen capsule sealed within the reflector, and a clear, front cover providing a seal for the module.

All of the above-identified applications were filed Apr. 10, 1984 and are assigned to the same assignee as the instant invention.

DESCRIPTION

Technical Field

The present invention relates in general to a new and improved headlight module for use within a lighting assembly for motor vehicles. More particularly the present invention relates to a headlighting module for use in an improved lighting assembly designed specifically to provide for improved aerodynamic performance of the motor vehicle using same and for ease of replacement of the modules employed therein.

BACKGROUND

Excluding those mentioned above, sealed beam lighting systems used in motor vehicles, and in particular those for providing forward illumination for automobiles, have generally not been designed with aerodynamic considerations in mind. As such, these lighting systems have exhibited poor aerodynamic performance. The typical minimum height of headlights (headlamps) found in such lighting systems is no less than about four inches (some as high as seven inches). including systems having four rectangular headlamps (two per side) as part thereof. Of equal importance is the total area of the headlighting system when viewed from the front. In many existing systems, total vertical areas of about seventy to ninety square inches are common. Understandably, such large areas contribute to poor aerodynamic performance of the respective motor vehicles. In this regard, the following Table is a list of many existing (again excluding those mentioned above) multiple headlamp lighting systems illustrating the approximate height and total frontal (vertical) area of each system listed.

TABLE

| System | Headlamp Type | Approx. Height (Inches) | Approximate Total System Area (Sq. Inches) |
|---|---|---|---|
| Sealed Beam Headlamps | | | |
| 2 Lamp, Round | 2D | 7 | 77 |
| 4 Lamp, Round | 1C/2C | 5¼ | 87 |
| 2 Lamp, Rectangular | 2B | 5½ | 83 |
| 4 Lamp, Rectangular | 1A/2A | 4 | 96 |
| 2 Lamp, Rectangular | 2E | 4 | 48 |

In a system not referred to in the above Table, a lamp capsule element is replaced in a fixed reflector-lens combination (i.e., through a rear opening in the reflector). However, with this system, there exists the potential for a tolerance control problem, in particular between the positional arrangement of the lamp's filament and the reflector. With lighting systems such as the aforementioned replaceable system and those mentioned in the Table above, there is also the problem that when a headlamp burns out, a major portion of the forward light pattern is lost due to the inability of only the single headlamp remaining (in a two headlamp arrangement to provide sufficient forward illumination. In a four headlamp system (two per side) a significant reduction in output on one side of the vehicle occurs. Still another problem in the above systems with separate headlamps being used for high and low beam is the inherent lack of flexibility, particularly in optimizing both high and low beam patterns. In those systems in which two filaments are employed in a single lens-reflector combination the lens element can typically be optimized for only one pattern. Switching to the second filament results in a compromised light distribution.

Lastly, and perhaps most significantly, headlamp systems of the replaceable type and of the type described in the above Table typically mandate relatively complex alignment procedures (which are usually only capable of being accomplished by a skilled technician) to both maintain the headlamp in required alignment and to assure that a replacement therefor is in turn also correctly oriented within the vehicle. Examples of such procedures, and the various complex vehicle structures necessary to achieve these, are shown in U.S. Pat. Nos.

4,188,655, 4,471,413 and 4,503,486. Understandably, the requirement for such apparatus adds to the cost of the headlamp system as well as that of the vehicle utilizing same.

DISCLOSURE OF THE INVENTION

It is therefore, a primary object of the present invention to provide a new and improved motor vehicle headlight module which, when used with other, similar modules in a headlighting system, results in a system which obviates the disadvantages associated with existing vehicle lighting systems of the currently available replaceable type and of the type described in the above Table.

Another object of the invention is to provide a new and improved motor vehicle headlight module wherein replacement thereof can be readily accomplished in a safe and facile manner, while assuring precise alignment thereof within the system's holder to thereby assure optimum light output from the assembled device.

Still another object of the invention is to provide a headlight module which can be produced on a mass production scale, and which is therefore relatively inexpensive to the consumer.

In accordance with one aspect of the invention, there is provided a motor vehicle headlight module designed for use in a motor vehicle headlight assembly which in turn may form part of an overall lighting system for use in the motor vehicle. The module comprises a plastic reflector having a forward opening and a rear neck portion, a low wattage tungsten halogen capsule sealed within the reflector, the capsule including a glass envelope and a pair of conductive lead-in wires projecting from the envelope and passing through a wall of the rear neck portion of the reflector. sealing means secured to the reflector to provide a cover for the forward opening, the sealing means being light-transmitting to enable light from the capsule to pass therethrough, connector means removably positioned on the rear neck portion of the reflector in a slidable manner, the connector means including contact means therein for being electrically coupled to the projecting lead-in wires of the capsule when the connector means is positioned on the reflector, and retention means secured to or forming part of the reflector and projecting therefrom for positively engaging the connector means to retain the connector means on the neck portion of the reflector in a locked manner.

BRIEF DESCRIPTION OF THE DRAWINGS

FIG. 3 is a partial perspective view, on an enlarged scale, of the module of FIG. 2. illustrating a preferred means for aligning the module relative to a common holder member which may form part of the vehicle's lighting assembly;

FIGS. 6 and 7 represent various embodiments of means for retaining the invention (only one shown) within a common holder member such as shown in FIG. 1, the holder only being partially shown for illustration purposes; and FIG. 8 represents an alternate means of positioning the invention within said common holder member.

BEST MODE FOR CARRYING OUT THE INVENTION

For a better understanding of the present invention, together with other and further objects, advantages and capabilities thereof, reference is made to the following disclosure and appended claims in connection with the above-described drawings.

Figure 1:
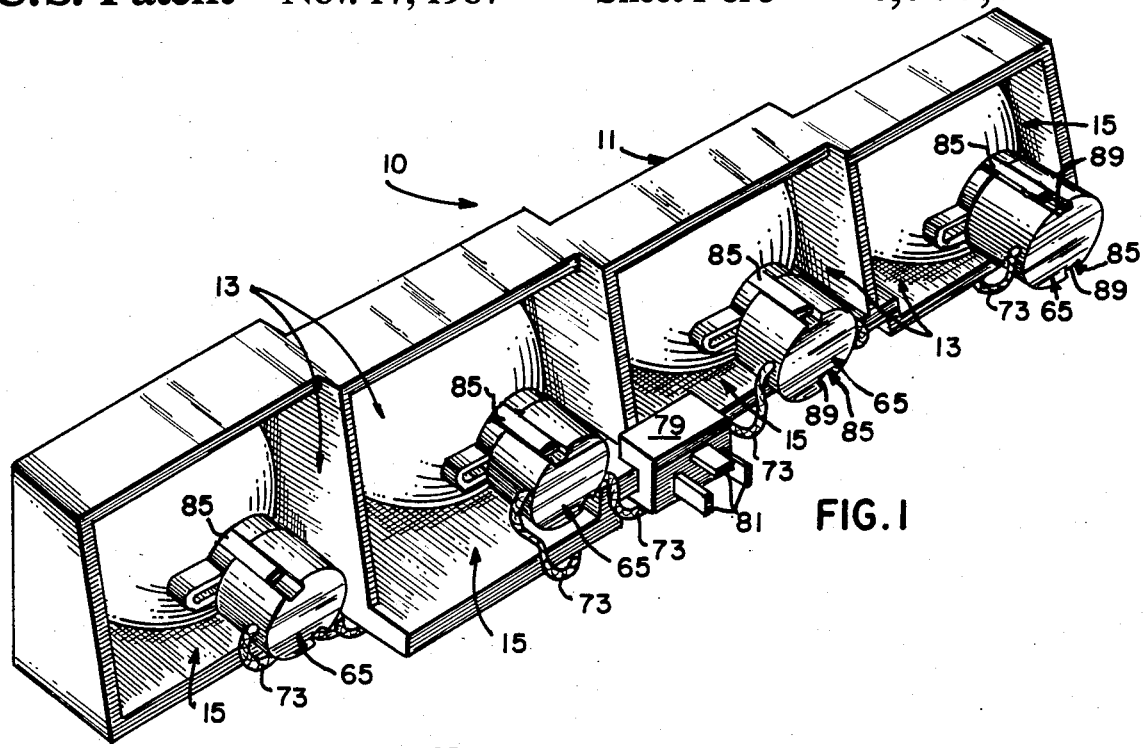
FIG. 1 is a perspective view of a motor vehicle lighting assembly capable of utilizing the headlight module of the instant invention.

With particular attention to the drawings, in FIG. 1 there is illustrated a motor vehicle lighting assembly 10 designed for containing therein at least one of the headlight modules of the instant invention. In a preferred arrangement, the assembly is utilized in combination with a second similar assembly to constitute an overall vehicle lighting system. Accordingly, the assembly is designed for being positioned on one side of the forward portion of a motor vehicle to work in cooperation with the other assembly positioned on an opposite side of the vehicle to provide the required forward illumination. As will be understood from the description below, the assembly possesses a small overall height and occupies a relatively small frontal area, thus allowing the motor vehicle in which the invention is utilized to possess a correspondingly reduced frontal section. Improved aerodynamics can thus be realized. In addition, it will be understood from the following description that the individual light sources (modules) as used in this assembly can be of relatively simple design and easily replaceable while still assuring the necessary, critical alignment. In addition, each module requires a minimum of storage space by the vehicle owner.

Assembly 10 may include a common holder member 11 which in turn may define a plurality of rectangular compartments 13 therein, each of which is designed to accommodate a respective one of the plurality of replaceable, sealed lighting modules 15 of the instant invention. These modules constitute the individual light sources for such an assembly. Common holder member 11 may be of plastic material e.g., a polycarbonate). and is adapted for being positioned within and secured to the motor vehicle (not shown) designed to house the assembly. Accordingly holder member 11 may be aligned relative to the vehicle such that when the individual modules 15 of the invention are fully positioned therein, these modules are also aligned to provide optimum forward illumination. Such alignment of holder member 11 is possible using various means, including threaded adjusting rods, adjustable ball and socket means, etc. within the scope of those versed in the art. Such components typically form part of or are secured to the vehicle bodywork and may function to align the holder member relative thereto. Further description of these components is thus not believed necessary.

In one example, holder member 11 may be of linear configuration and possess an overall height of only about two inches and a corresponding width of only ten inches, and may be particularly adapted for being substantially horizontally positioned on the respective forward portion of the vehicle. The various compartments may also be arranged in a juxtaposed (side-by-side) pattern as depicted in FIG. 1 with the top and bottom boundaries thereof determined by the substantially parallel upper and lower, flat walls of holder member 11. Even more preferably, these compartments may be arranged so as to be slightly staggered, with each succeeding compartment being set back slightly from that immediately adjacent thereto. Accordingly, the outermost compartment (that nearest the respective side of the vehicle) will be that one set the farthest back to thus accommodate for existing and anticipated frontal vehicle designs.

As stated, the sealed lighting modules 15 of the present invention are particularly adapted for being positioned within a holder such as holder 11 and are also specifically designed to being easily removed therefrom. In comparing FIGS. 1 and 2 each module 15 as taught herein includes a reflector 17, a lighting capsule 19 sealed within the reflector in alignment with the reflecting surfaces 21 thereof, and means 23 for sealing and providing a closure for the module reflector 17 to thus hermetically seal capsule 19 therein. Reflector 17 is preferably of high temperature plastic with the interior reflecting surfaces 21 being of substantially parabolic configuration. These surfaces are also preferably coated with a reflective coating (e.g., aluminum) to provide for enhanced reflectivity. Sealing means 23 is substantially planar and includes a plurality of lensing elements 25 which function to direct light both direct and reflected, passing through means 23 to define the ultimate pattern desired. Means 23 is preferably of glass material (e.g., hardglass) but, alternatively, may be of plastic (e.g., polycarbonate). Means 23 is sealed to the planar forward portion of reflector 17 (to cover the reflector's forward opening) by a suitable adhesive, (e.g., epoxy) several of which are known in the art.

The forward opening of reflector 17 is planar and preferably of rectangular configuration, as shown, and, in one example, possessed a height of only about two inches and a width of only about two and one-half inches.

As stated above, it is preferred that each sealing means 23 includes lensing elements such that each module 15 will in turn provide its own lensing functions for the light emitted therefrom. As an alternative embodiment, however it is within the scope of the invention to provide a clear (transparent) cover which does not include lensing elements or the like as part thereof. Accordingly a separate lensing member could in turn be utilized in combination with module 15 to provide the necessary lensing function. Still further, it is within the scope of the invention to provide a singular, common lens member which can function to provide lensing for all of the modules used in a common holder such as holder member 11. Such a lensing component could in turn substantially match the outer counter of the motor vehicle in which such a holder is used with assembly 10 placed immediately therebehind. Accordingly, a spacing could be provided between such a common lens component and assembly 10. Examples of such common lens components suitable for this use are illustrated in the aforementioned U.S. Pat. Nos. 4,545,001 and 4,569,002. Should a common lens or other lensing member as mentioned above be utilized, it is possible to hermetically seal such a component to the forward portion of holder member 11 so as to provide a sealed assembly wherein each of the invention's modules can also be sealed thereto when positioned in the holder. Additional sealing material (not shown) would be employed in such a case to effectively seal the front part of the module's reflector and/or the sealing means 23 to such an assembly.

In accordance with the teachings of the instant invention, each of the modules 15 includes means for providing alignment between the module and a suitable holder such as holder 11 such that each module is precisely aligned relative to the holder. This constitutes a significant feature of the invention as defined herein and is considered particularly important in order that the final assembly using the holder and the modules can provide optimum forward illumination as is essential in the motor vehicle field. In comparing FIGS. 2 and 3, a preferred embodiment of such an aligning means is shown. Sealing means 23 has been omitted in FIG. 3 for purposes of clarity. As stated holder member 11 is designed for being directly or indirectly secured to and aligned with the bodywork (represented in phantom in FIG. 3 by the numeral 27) of the respective motor vehicle in which the assembly containing several of the modules as taught herein is to be utilized. As such, the holder is oriented such that it can be pivotally moved (i.e., about a common point 29) in a horizontal manner to allow for alignment thereof. Accordingly, holder 11 can be so positioned on such bodywork or on an appropriate housing designed to accommodate the holder. Such a housing would in turn be appropriately secured to the vehicle's bodywork. Suitable means (e.g., threaded adjustment screws) can be utilized to provide the precise alignment required. To compensate for vehicle tilting or other misalignment, it is also possible to provide some form of vertical alignment (e.g., a bubble level) as a part of the common holder member itself. Of significance, reflector 17 of module 15 is specifically designed to align with corresponding surfaces within the respective compartment of common holder 11. This is accomplished by providing the reflector with an external, projecting flange member 31 which is located about the reflector's forward opening and is of substantially planar (flat) configuration. Flange 31 includes a plurality of protruberances (or aiming pads) 33 positioned thereon in accordance with a predetermined pattern, each of which is designed for being aligned with a corresponding boss 35 or the like formed within common holder 11. In a preferred embodiment, each protruberance 33 is of substantially rectangular configuration although an alternative shape (e.g., annular) is possible. In addition, these members are arranged such that two protruberances occupy one of the outstanding sides of flange 31 with the other located on an opposite side thereof. These protruberances thus occupy a substantially triangular pattern having two sides of substantially equal length.

Figure 2:
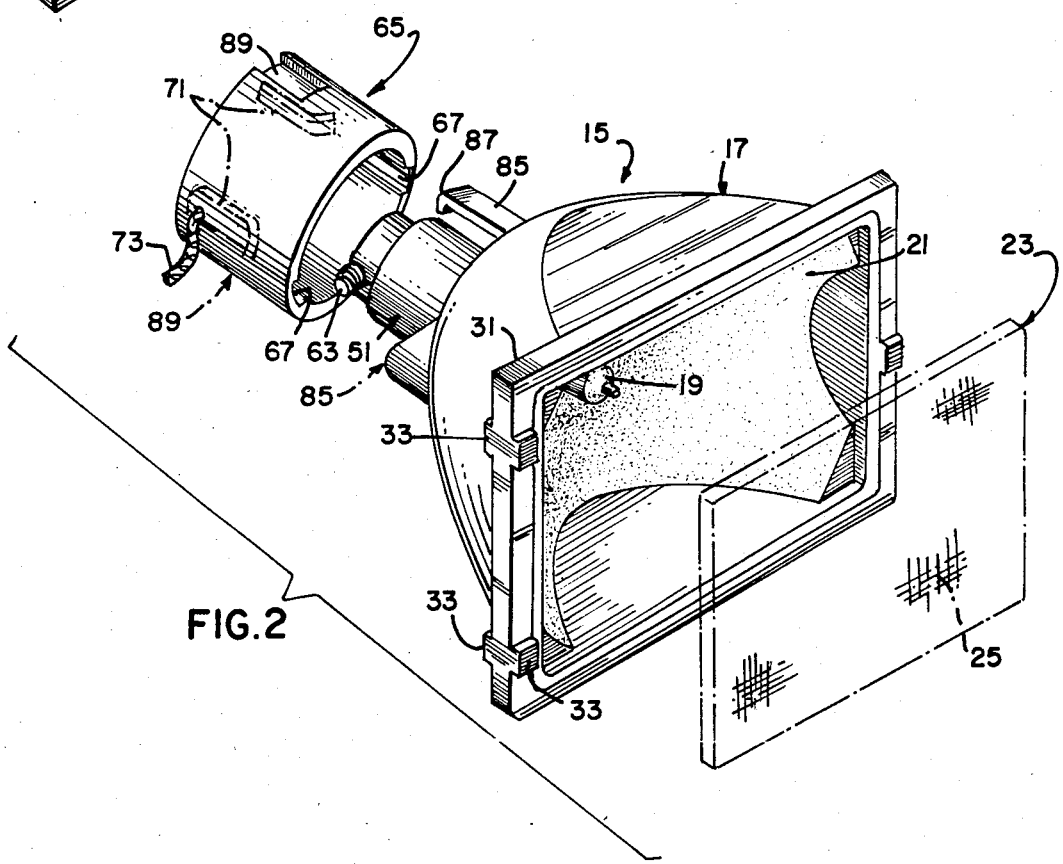
FIG. 2 is a perspective view, on an enlarged scale, of a preferred embodiment of the headlight module for use in the assembly of FIG. 1.

In the embodiment of FIG. 3, each module is designed for being positioned within common holder 11 in a forward direction (toward the front of the vehicle). Alternatively, it is possible to provide a similar pattern of protruberances 33 on the reverse side of flange 31 such that the invention can be inserted within the respective compartment of a common holder in a reverse direction (toward the rear of the motor vehicle). Two of such protruberances are depicted in FIG. 2 (but omitted in FIG. 3), which, as is understood, represents a universal form of the invention which is capable of being both front- and rear-loaded. An example of a rear-loaded module 15 is depicted in FIG. 8 wherein the preferred common holder member is shown to include an alternative upstanding wall 37 which in turn includes therein respective bosses 35 (only two shown in FIG. 8) designed to accommodate the respective protruberances of the invention's reflector 17.

In accordances with the teachings herein, it is not essential that each of the protruberances 33 of reflector 17 be of uniform thickness. It is only essential for the purposes of this invention that these protruberances occupy a common plane while the corresponding bosses 37 of holder member 11 must also lie within a singular plane parallel to that occupied by protruberances 33. Each module can thus be photometrically aimed at the manufacturing facility with respect to a universal holder component possessing similar dimensions to that ultimately used in the motor vehicle. The parallelism of the respective mounting surfaces are thus held within close tolerances during such manufacture, particularly when utilizing plastic for the respective holder and reflector components. This is primarily due to the ability to produce (e.g.. injection mold) these components at such close tolerances or to accurately machine, after such molding, the protruberances and/or bosses to these precise dimensional requirements. Subsequent aiming of the capsule within the vehicle holder by the vehicle operator is thus not necessary. In addition, replacement of a defective module can be easily accomplished while still assuring the required precise alignment.

The main light source for the instant invention is a low wattage tungsten halogen capsule which is integrally mounted in reflector 17. Each capsule includes a pair of lead-in wires 41 (FIG. 5) which project externally from a press-sealed end 43 of the capsule's hard-glass (e.g.. aluminosilicate) envelope 45. Each wire 41 is metallic and electrically conductive and passes through a rear wall 49 located within a neck portion 51 of reflector 17. This neck portion 51 projects externally from the rear of the reflector in the manner depicted in FIG. 5. As stated, each capsule is sealed within the reflector. In a preferred embodiment, each of the lead-in wires passes through a respective aperture within rear wall 49. Thereafter a sealing material (e.g., RTV cement or epoxy) is employed to hermetically seal the wires in the plastic material of the reflector's rear wall. Prior to such sealing, however, capsule 19 is aligned (focused) in a predetermined manner relative to the internal reflective surfaces 21. Such alignment involves utilization of photometric apparatus known in the art with the light capsule being energized and thus emitting light through the forward sealing means 23 which has already been sealed to the reflector. When the optimum distribution is determined, final sealing of the lead-in wires in position occurs.

Figure 5:
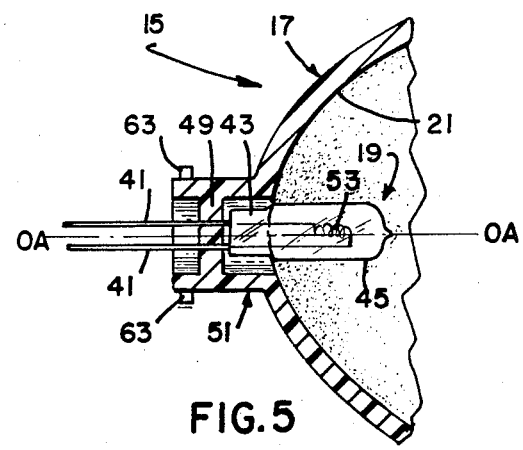
FIG. 5 is a partial elevational view, in section, illustrating the position of the invention's capsule relative to the internal reflective surfaces of the reflector.

As indicated previously the lighting capsule for use in each of the invention's module is of the low wattage type. By low wattage is meant a wattage within the range of only about ten to about twenty-five watts. The tungsten halogen capsule itself may be one known in the art. Typically, this comprises the aforementioned hard-glass envelope having the described press sealed end with the lead-in wires (e.g., nickel or molybdenum) projecting therefrom. Each capsule in turn includes a coiled filament (e.g., tungsten) which is electrically connected to each of the projecting lead-in wires. This filament is represented by the numeral 53 in the drawings and preferably lies along the optical axis (OA—OA) of the reflector (FIG. 5). Axial mounting is preferred for at least two reasons. First this arrangement maximizes utilization of the reflector region near the horizontal plane (e.g., that region known to provide optimum control of high intensity gradients). Second, the filament image reflected from the envelope of the lamp capsule is directed back onto the filament. Since this reflected filament image has a luminance of approximately ten percent of the filament itself, it can strongly contribute to stray or uncontrolled light if not blocked by the filament. The axial filament is a preferred form of construction to assure this and in one example a single coil (C8) filament was used with the capsule producing approximately 18 watts during operation. Of added significance the lighting capsule as used in the instant invention is positioned of sufficient depth within the neck portion 51 of reflector 17 such that the press seal 43 of the capsule is recessed therein. Light emitted from the capsule through the press seal end is non-uniform. That is, the light passing therethrough is variable and would scatter over a relatively large section of the reflector's internal surfaces to in turn contribute to glare. To prevent this, the press seal end of the capsule is positioned at the depth illustrated in FIG. 5. Still further, possible light non-uniformity resulting from varying envelope thicknesses is substantially overcome by modification of the reflector's internal surfaces to compensate for such variations. Attention is directed to copending application Ser. No. 826,526, entitled "Motor Vehicle Headlight". filed Feb. 6, 1986, wherein the preferred technique for positioning the capsule relative to the reflector is described. This copending application also defines a desired filament configuration for use in a lighting capsule of the type taught herein.

Figure 4:
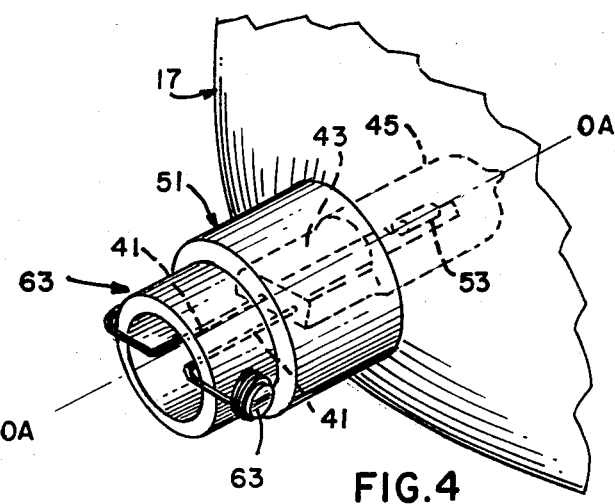
FIG. 4 is a partial perspective view on an enlarged scale, illustrating the preferred means for positioning the lighting capsule of the invention within the invention's reflector and for providing external connection thereto.

Located within opposing sides of the projecting, cylindrical shaped neck portion of reflector 17 are a pair of electrical contact means 63 (FIG. 4) which, in preferred form, are a pair of cylindrical posts embedded within or extending from and forming part of the neck portion's plastic material. Each post, which alternatively may be a metallic pin embedded within the reflector's neck portion, is adapted for having the terminal end segments of a respective lead-in wire 41 wrapped thereabout. Each of the invention's lead-in wires are wrapped about the respective posts subsequent to the final positioning of the capsule within reflector 17. Accordingly, such an operation will have no adverse effect on the desired positioning of the invention's capsule. One wrapped post 63 is shown in FIG. 2.

Each module includes a connector means 65 designed for being slidably positioned over the extending neck portion 51 of reflector 17. As shown in FIG. 2, the connector means 65 is preferably of hollow, substantially cylindrical configuration and includes a pair of opposed slots 67 therein each of which is designed to accommodate a respective one of the projecting contact posts 63. Each connector means in turn includes therein a pair of contacts 71 (illustrated in phantom in FIG. 2) which in turn each engage and are thus electrically connected to the wrapped wiring about a respective contact post 63 when the cylindrical connector 65 is fully positioned on reflector 17 (i.e.. FIG. 1). Each contact is in turn aligned within or adjacent one of the slots 67 to facilitate such contact. In other words, connector means 65 functions as a female socket member designed to accommodate the male neck portion of the invention's reflector. Connector means 65, like reflector 17, is preferably plastic (e.g.. polycarbonate). Electrically coupled to each of the contacts 71 is an electrical wire 73 which in turn is adapted for being electrically connected to a connector 79 which may be secured to or which forms part of the common holder. As shown in FIG. 1, this common connector may be substantially centrally disposed on the holder member at the rear thereof to be ideally suited for being connected to a suitable connector not shown) of the plug variety which in turn forms part of the motor vehicle's electrical system. Ideally, common connector 79 possesses a total of three male prongs 81. It is understood, however, that the invention is not limited in scope to use in the holder shown in the drawings. Nor is it limited to a connector such as connector 79. For example, it is well within the scope of this invention to directly couple each of the invention's wires 73 to the vehicle's electrical system.

To retain each of the described connector means 65 in position on the respective reflector of the invention, the rear portion of each reflector includes a pair of spaced apart arm members 85 which form part of or are secured to the rear of the reflector and project substantially parallel to the extending cylindrical neck portion 51 on opposite sides thereof. Only one of these arm members 85 is shown in FIG. 2, but it clearly seen in FIGS. 1, 7 and 8 that two are used with both extending parallel along opposite sides (top and bottom) of the cylindrical neck. Each arm member 85 includes a hooked end portion 87 (FIG. 2) which is designed for aligning with and positively engaging a designated external surface of connector means 65 as located within a slot formed therein. Each arm member is thus capable of expanding outwardly during initial positioning of connector means 65 but thereafter returns to grasp the connector means and lock it in place. Arm members 85 are omitted in FIGS. 4 and 5 for purposes of clarity.

Figure 6:
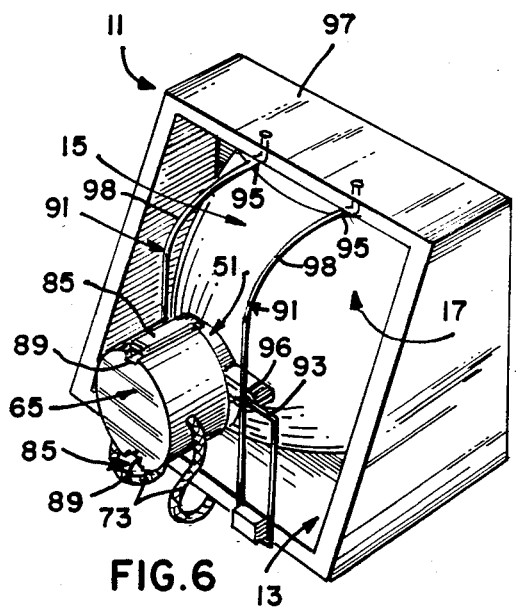

In FIGS. 6 and 7, there are illustrated two examples of embodiments capable of retaining the invention within a holder such as holder 11. For illustration purposes, only one compartment 13 is shown in FIGS. 6 and 7. In FIG. 6, the retention means comprises a pair of opposed wireform members 91 which are both of substantially similar configuration and which include a first end segment 93 designed to positively engage a projecting flange 96 or similar portion of neck portion 51 and an opposed, end segment 95 designed for being securedly positioned (inserted) within an upper wall 97 of the holder. These retention means are omitted in the perspective view of FIG. 1 for purposes of clarity. The curvilinear main body segment 98 of each wireform engages the first end segment 93 to assist in retention thereof against the reflector. Each wireform is of relatively simple construction and thus be readily manipulated by an individual with only a minimum of mechanical skills. Removal of the invention is accomplished by said individual merely exerting a minimum of downward pressure on the curvilinear body portion 98 to effect separation of the second end segments 95 from the holder. Each wireform may then be pivoted backward until full disengagement from reflector 17 is achieved. As understood, the function of each wireform is to force the module against the corresponding internal surfaces of the holder member designed to house same.

In the embodiment of FIG. 7. a singular wireform 91' is utilized, this wireform having a main body segment 98' which is pivotally oriented on a bottom wall of the holder. A pair of curvilinear end segments extend from the common body member and engage a respective internal surface of the reflector 17 on opposing sides thereof to force it against the respective internal surfaces of the holder. Each curvilinear end segment is in turn locked in position within a slot formed within a respective projection 99 formed as part of or secured to one of the two upstanding walls of the holder. Removal is easily accomplished by simply moving each end segment forward until total disengagement occurs from the holder and thereafter pivotally moving the singular wireform in a direction backwardly (to the rear) from the holder's forward opening. Module replacement can then be facilely achieved. As stated, each wireform is of metallic material and may be produced from any metal (e.g.. steel) capable of being readily formed and providing the necessary resilience required herein.

In summary, there has been defined a headlight module designed to form part of a forward illumination (headlighting) assembly for use in a motor vehicle in combination with another, similar assembly that is, remarkably, only about two inches high and has an overall width of only about ten inches. Such an assembly may include a plurality (e.g., four or five) of the lamp-reflector modules of the invention, which modules function as the light sources for the invention. Each is thus constructed as an integral, hermetically sealed unit which can be facilely positioned within and removed from such an assembly's holder so as to be accurately aligned therewith. Accordingly. the invention as defined herein possesses several advantages over existing headlight units as used in replaceable systems and systems listed in the above Table. For example, use of multiple sources provides some desired redundancy in that more than one section of such an assembly provides illumination to the same region of space forward of the vehicle with nearly identical light distribution. Thus, should one of the four modules fail (burn out), a major part of the forward light pattern will not be lost. In addition, it is known that only certain parts of the reflector as used in most headlights provide beam elements suitable for developing the high intensity gradients required for the sharp cut-off of the low beam pattern near the horizontal plane through the vehicle's light source. A greater percentage of net reflector area for developing high intensities near the horizontal with minimum glare in the upper left quadrant (toward oncoming drivers) is possible using modules as taught herein through the utilization of several, but more numerous reflector elements. Finally, an increase in the number of individual lighting modules increases the flexibility of optimizing both the high and low beams. This is possible by switching (activating) selected modules for either high or low beam while leaving other modules energized for both patterns. In one example, a pair of modules located within the outermost two compartments of such a common holder as defined herein may serve to provide one-half of the low beam function while another pair of modules may provide one-half of the total high beam function. Thus, an oncoming driver would face a total of four individual modules at low beam and a total of four lighted modules at high beam in a system utilizing two of the assemblies as defined herein. As yet another embodiment, it is also possible to use a total of five modules per assembly, with a specified number thereof (e.g.. two) providing the low beam function and the remaining number (e.g., three) providing the high beam function.

While there have been shown and described what are at present considered the preferred embodiments of the invention, it will be obvious skilled in the art that various changes and modifications may be made therein without departing from the scope of the invention as defined by the appended claims.

What is claimed is:

1. A motor vehicle headlight module comprising:
a plastic reflector having a forward opening and a rear neck portion;
a low wattage tungsten halogen capsule sealed within said reflector, said capsule including a glass envelope and a pair of conductive lead-in wires projecting from said envelope and passing through a wall of said rear neck portion of said reflector;
sealing means secured to said reflector to provide a cover for said forward opening, said sealing means being light-transmitting to enable light from said capsule to pass therethrough;
connector means removably positioned on said rear neck portion of said reflector in a slidable manner, said connector means including contact means therein for being electrically coupled to said projecting lead-in wires of said capsule when said connector means is positioned on said reflector; and
retention means secured to or forming part of said reflector and projecting therefrom for positively engaging said connector means to retain said connector means on said neck portion of said reflector in a locked manner.

2. The headlight module according to claim 1 wherein said forward opening of said reflector is of substantially rectangular configuration, the reflector surfaces of said reflector being substantially parabolic in configuration.

3. The headlight module according to claim 1 wherein said sealing means comprises a glass lens.

4. The headlight module according to claim 3 wherein said forward opening of said reflector and said glass lens are substantially planar.

5. The headlight module according to claim 1 wherein said reflector includes a flange portion located substantially about said forward opening.

6. The headlight module according to claim 5 further including alignment means located on or forming part of said flange portion of said reflector for aligning said module relative to a holder member adapted for being positioned within said motor vehicle.

7. The headlight module according to claim 6 wherein said alignment means comprises a plurality of protruberances spacedly located on said flange portion of said reflector in a predetermined pattern, said protruberances occupying a common plane and being adapted for aligning with and engaging a corresponding number of bosses formed within said holder member.

8. The headlight module according to claim 7 wherein the number of protruberances is three, two of said protruberances spacedly located on one side of said flange portion of said reflector and the other of said protruberances located on a side of said flange opposite said side having said two protruberances thereon.

9. The headlight module according to claim 1 further including electrical contact means located within and projecting from said rear neck portion of said reflector.

10. The headlight module according to claim 9 wherein said contact means comprises a pair of posts, each of said posts projecting from said rear neck portion on opposite sides of said neck portion, each of said projecting portions of said lead-in wires wrapped about and secured to a respective one of said posts.

11. The headlight module according to claim 10 wherein said connector means comprises a hollow socket member including a pair of electrical contacts positioned therein, each of said electrical contacts engaging a respective one of said posts having one of said lead-in wires wrapped thereabout when said socket member is positioned on said rear neck portion of said reflector.

12. The headlight module according to claim 1 wherein said retention means comprises at least one arm member projecting from said reflector for engaging a surface of said connector means in a locking manner.

13. The headlight module according to claim 12 wherein said connector means includes at least one slot therein, said arm member extending within said slot to engage said surface of said socket member.

* * * * *